United States Patent
Harikrishnasamy et al.

(10) Patent No.: US 11,460,143 B2
(45) Date of Patent: Oct. 4, 2022

(54) COLLAPSIBLE PATTERN

(71) Applicant: WHIRLPOOL CORPORATION, Benton Harbor, MI (US)

(72) Inventors: Arunkumar Harikrishnasamy, Stevensville, MI (US); Sai B. Krishna, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 45 days.

(21) Appl. No.: 16/417,804

(22) Filed: May 21, 2019

(65) Prior Publication Data

US 2020/0370702 A1   Nov. 26, 2020

(51) Int. Cl.
| | |
|---|---|
| *F16L 59/065* | (2006.01) |
| *F16L 59/02* | (2006.01) |
| *A47L 15/42* | (2006.01) |
| *F16L 59/12* | (2006.01) |
| *F25D 23/06* | (2006.01) |
| *B29L 31/00* | (2006.01) |

(52) U.S. Cl.
CPC ......... *F16L 59/028* (2013.01); *A47L 15/4209* (2016.11); *F16L 59/065* (2013.01); *F16L 59/12* (2013.01); *F25D 23/064* (2013.01); *B29L 2031/762* (2013.01); *F25D 2201/12* (2013.01)

(58) Field of Classification Search
CPC .. F16L 59/028; F16L 59/065; B29L 2031/762
See application file for complete search history.

(56) References Cited

U.S. PATENT DOCUMENTS

| | | | |
|---|---|---|---|
| 1,898,977 A | | 2/1933 | Comstock |
| 1,987,798 A | | 1/1935 | Ruppricht |
| 2,745,173 A | | 5/1956 | Janos |
| 5,632,543 A | | 5/1997 | McGrath et al. |
| 6,001,449 A | | 12/1999 | Hunter et al. |
| 6,253,520 B1 | * | 7/2001 | Houk ........................ E04B 1/08 |
| | | | 52/590.2 |
| 6,860,082 B1 | * | 3/2005 | Yamamoto ........... B62D 33/048 |
| | | | 52/794.1 |
| 9,523,459 B2 | | 12/2016 | Min et al. |
| 11,150,008 B2 | * | 10/2021 | Harikrishnasamy ....................... |
| | | | F25D 23/069 |
| 2003/0094048 A1 | * | 5/2003 | Ferrario ................ G01M 3/366 |
| | | | 73/724 |
| 2005/0236947 A1 | * | 10/2005 | LeClear ................. A47B 88/00 |
| | | | 312/404 |

(Continued)

FOREIGN PATENT DOCUMENTS

| | | |
|---|---|---|
| DE | 102011076100 | 11/2012 |
| DE | 102012221010 A1 | 5/2014 |

(Continued)

*Primary Examiner* — Tong Guo
(74) *Attorney, Agent, or Firm* — Price Heneveld LLP (57) ABSTRACT

An insulating structure for an appliance including a first panel, a second panel coupled to the first panel, wherein the first and second panels define a cavity, an insulation material disposed within the cavity, at least one central flattening portion of the first and second panels, the at least one central flattening portion defining an enlarged area of the cavity in a rest state and having deflection control features, and structural reinforcements defined by the deflection control features of the at least one central flattening portion.

7 Claims, 11 Drawing Sheets

(56) References Cited

U.S. PATENT DOCUMENTS

| | | | |
|---|---|---|---|
| 2008/0072613 A1* | 3/2008 | Liu | F24F 1/0059 |
| | | | 62/259.1 |
| 2010/0095622 A1 | 4/2010 | Niemoller | |
| 2014/0026885 A1* | 1/2014 | Aiso | F24S 80/54 |
| | | | 126/652 |
| 2017/0184340 A1* | 6/2017 | Allard | F25D 23/062 |
| 2017/0219273 A1 | 8/2017 | Jung et al. | |
| 2019/0137166 A1* | 5/2019 | Dherde | F25D 23/063 |
| 2019/0162355 A1* | 5/2019 | Ernat | F25D 23/065 |

FOREIGN PATENT DOCUMENTS

| | | | |
|---|---|---|---|
| EP | 2427708 B1 | 3/2012 | |
| EP | 2732225 B1 | 5/2014 | |
| EP | 2936015 B2 | 10/2015 | |
| EP | 3699522 A1 | 8/2020 | |
| WO | WO-2018067123 A1 * | 4/2018 | F25D 23/066 |
| WO | 2018118080 A1 | 6/2018 | |
| WO | 2018199980 A1 | 11/2018 | |

\* cited by examiner

COLLAPSIBLE PATTERN

BACKGROUND OF THE DISCLOSURE

The present disclosure generally relates to an insulating structure, and more specifically, to a collapsible pattern for an insulating structure.

SUMMARY OF THE DISCLOSURE

According to one aspect of the present disclosure, an insulating structure for an appliance includes a first panel and a second panel coupled to the first panel. The first and second panels define a cavity. An insulation material is disposed within the cavity. The insulating structure also includes at least one central flattening portion of the first and second panels. The at least one central flattening portion defines an enlarged area of the cavity in a rest state and includes deflection control features. In addition, structural reinforcements are defined by the deflection control features of the at least one central flattening portion.

According to another aspect of the present disclosure, an appliance includes an at least one first panel and an at least one second panel. The at least one first and second panels are coupled to define a structural member. A cavity is defined between the at least one first and second panels, and further an at least partial vacuum is defined within the cavity. In addition, insulation materials are disposed between the at least one first and second panels. Further, the appliance includes a central flattening portion of each of the at least one first and second panels, and structural reinforcements proximate the central flattening portion.

According to yet another aspect of the present disclosure, a method of forming a structural cabinet for an appliance includes forming a central flattening portion of each of a first panel and a second panel, disposing a plurality of structural reinforcements proximate curved portions of the central flattening portions of the first and second panels, coupling the first panel to the second panel to define a cavity therebetween, disposing an insulation material within the cavity, the insulation material filling the cavity. Gas is expressed from the cavity to define an at least partial vacuum within the cavity. The central flattening portions and the plurality of structural reinforcements are utilized to deflect vacuum bow. The cavity is sealed, wherein the first and second panels are positioned to oppose an inward compressive force such that the central flattening portions of the first and second panels compress to maintain a consistent distance between the first panel and the second panel.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to an insulating structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
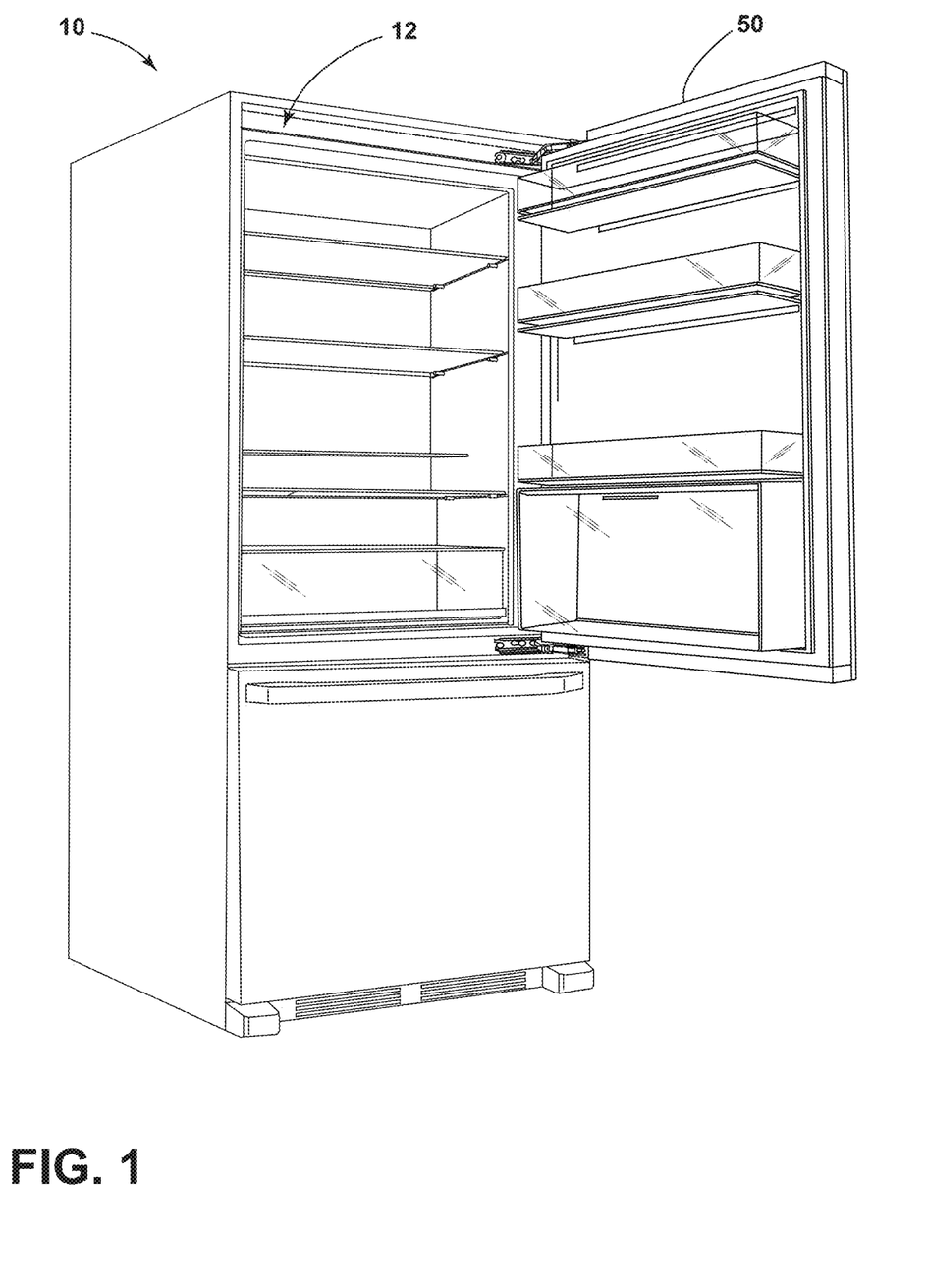
FIG. 1 is a front perspective view of an appliance of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-15, reference numeral 10 generally designates an appliance including an insulating structure 12. The insulating structure 12 includes a first panel 14 and a second panel 16, where the first and second panels 14, 16 are coupled together to define a cavity 18 in which an insulation material 20 is disposed. Additionally, the first and second panels 14, 16 include at least one central flattening portion 22, which defines an enlarged area 24 of the cavity 18 in a rest state 26 and includes deflection control features 28. Further, structural reinforcements 30 are defined by the deflection control features 28 of the at least one central flattening portion 22.

Referring again to FIGS. 1-8, the insulating structure 12 may be used as an insulation member for, as a non-limiting example, a door 50 of the appliance 10. Additionally or alternatively, the first and second panels 14, 16 may define a structural member 52, which may include either an insulated structural cabinet 54 or an insulated panel 56. According to various examples, the first and second panels 14, 16 of the insulating structure 12 are contemplated to be an at least one first panel 14 and an at least one second panel 16. Thus, a plurality of panels 62, may form a liner 64, or inner structure, and a wrapper 66, or outer structure, of the insulated structural cabinet 54. Said another way, multiple first and second panels 14, 16 may form the liner 64 and the wrapper 66 of the insulated structural cabinet 54. The first and second panels 14, 16 may be a metallic material that may at least partially resist deflecting, bowing, bending, or other forms of compression that may be caused by an inward compressive force 68 that may be exerted when an at least partial vacuum 70 is defined within the cavity 18.

Further, an opening 80 is defined by the liner 64 and may further be defined as a first opening 82 and a second opening 84 separated by a mullion 86. The opening 80 may receive the appliance 10 such that the insulating structure 12 encases the appliance 10. In such construction, it is generally contemplated that the insulated structural cabinet 54 may be used. Each of the first and second openings 82, 84 is also defined by a trim breaker 88. The trim breaker 88 may provide structural support for the liner 64 and wrapper 66 and to form the insulated structural cabinet 54. Additionally, apertures 90 may be defined on the wrapper 66 adjacent the mullion 86 and configured to attach with the appliance 10. Accordingly, the central flattening portion 22 may curve around the apertures 90. This curved configuration may also serve to control the vacuum bow of the central flattening portion 22 by providing a structural reinforcement 30 where it would otherwise be a straight edge 116 of the central flattening portion 22.

In forming the structural member 52, the liner 64 may be positioned adjacent within the wrapper 66 thus partially defining the cavity 18 and both of which may be coupled to the trim breaker 88 to fully define the cavity 18 in which the insulation material 20 is disposed. The insulation material 20 may be a carbon-based powder; however, it is generally contemplated that other standard insulation material 20 may be used; such materials are described more fully below. The insulation material 20 may be generally compressible such that the insulation material 20 provides minimal structural support during evacuation of the cavity 18. In other words, the inward compressive force 68 may be slightly resisted by the insulation material 20, but ultimately, vacuum bowing may occur despite the use of certain insulation material 20.

Additionally, the at least partial vacuum 70 is defined within the cavity 18 once the evacuation process has occurred and the insulating structure 12 is in the expressed state 100. As such, the at least partial vacuum 70 defines a pressure differential 96 between an exterior portion 98 of the insulating structure 12 and the cavity 18. Furthermore, the inward compressive force 68 is defined by the pressure differential 96. The inward compressive force 68 may cause the central flattening portion 22 of the insulating structure 12 to result in a vacuum bow or a deflection, as discussed above. The vacuum bow results in the central flattening portion 22 decreasing the size of the cavity 18 as a result of the wrapper 66 and the liner 64 compressing into the cavity 18. For example, in traditional insulating structures 12, vacuum bow may occur to such an extent generally ranging from about 10 millimeters to about 18 millimeters, or more, from the rest state 26 to an expressed state 100, which may result in a depth or thickness of the cavity 18 that is irregular across the insulating structure 12.

Figure 2:
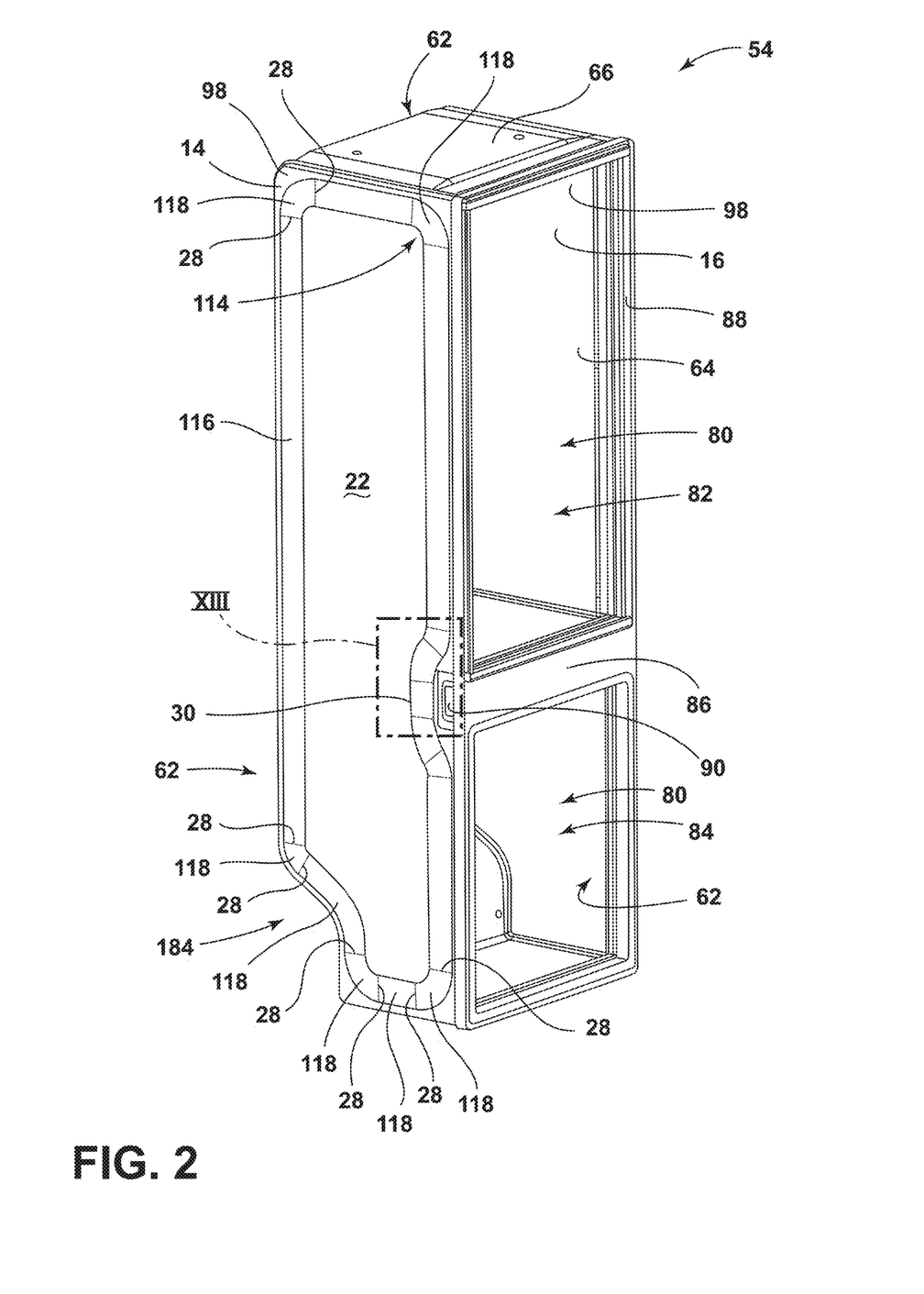
FIG. 2 is a top perspective view of an insulated structural cabinet of the present disclosure.
Figure 3:
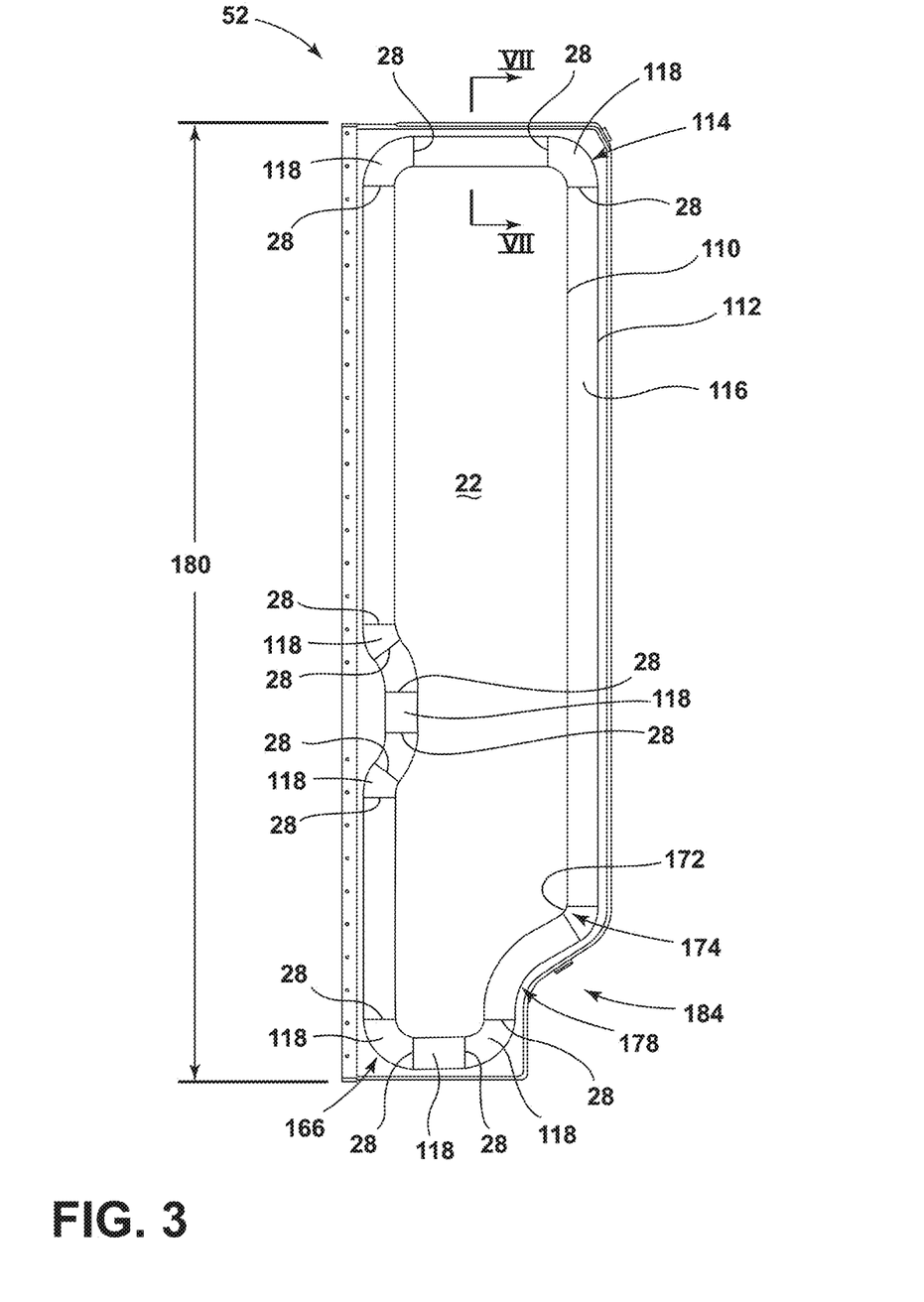
FIG. 3 is a side elevational view of an insulating structure of the present disclosure.
Figure 4:
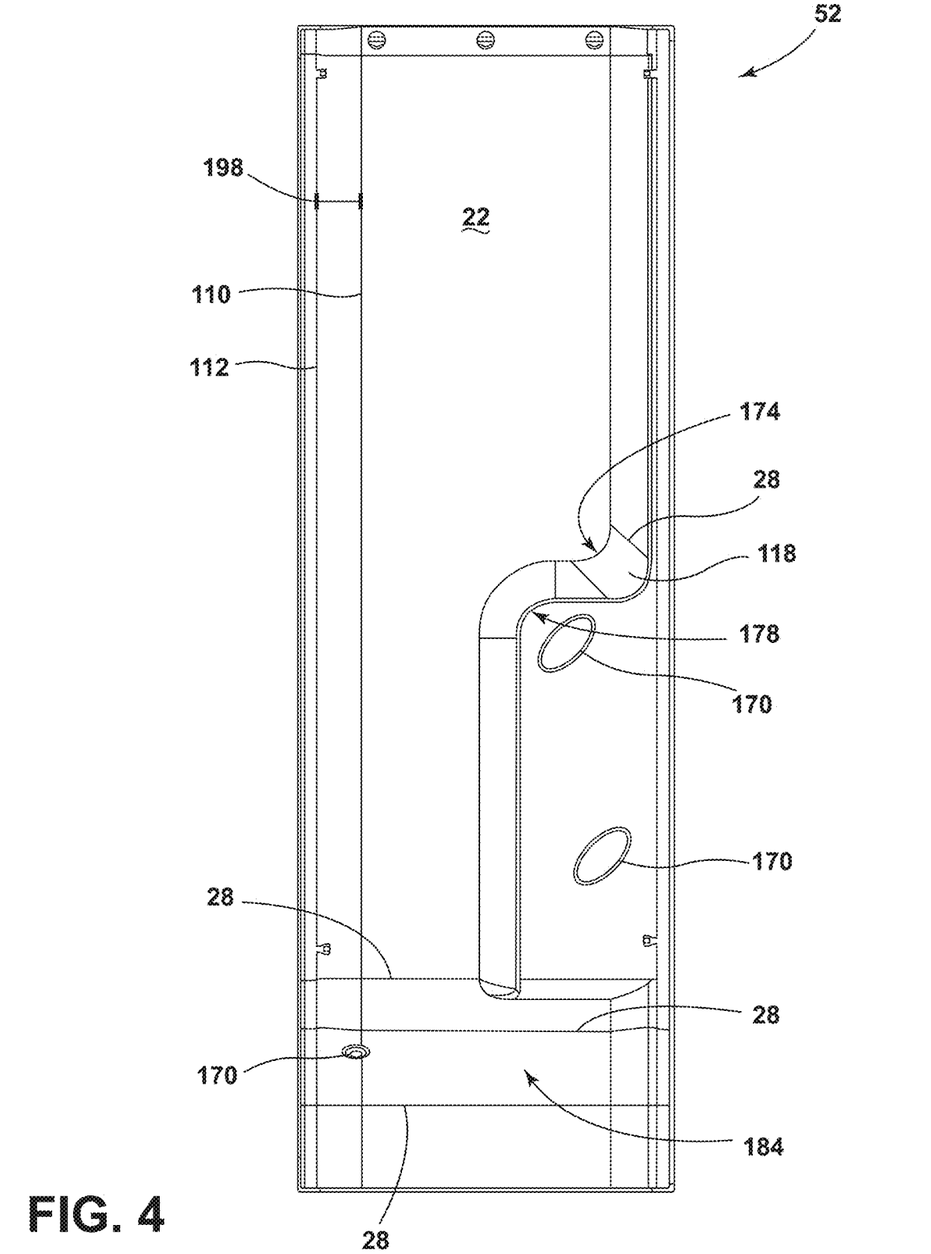
FIG. 4 is a side elevational view of the insulating structure of the present disclosure.

As illustrated in FIG. 2, the wrapper 66 includes the central flattening portion 22 defined by an inner perimeter 110 and an outer perimeter 112, which delineate at least one curved portion 114 defining the structural reinforcements 30. Additionally, the curved portion 114 may have a substantially scallop-shape, which may help to resist vacuum bow based on the shape, as described in more detail below. By way of example, and not limitation, when the insulating structure 12 undergoes the inward compressive force 68, the structural reinforcements 30 help resist and/or control biasing, bowing, or other deflection of the central flattening portion 22. The resistance of the biasing by the structural reinforcements 30 may be aided by the deflection control features 28 and stabilizing geometries 118 utilizing opposingly adjacent forces 120 of the stabilizing geometries 118. Said another way, upon transition from the rest state 26 to the expressed state 100, the stabilizing geometries 118 of the structural reinforcements 30 and the deflection control features 28 stabilize and control the deflection of the central flattening portion 22.

Referring again to FIGS. 9-14, for purposes of illustration and depiction, the stabilizing geometries 118 of the central flattening portion 22 have been exaggerated to show detail, but the general construction of the stabilizing geometries 118 may generally be as depicted. Each stabilizing geometry 118 may have a generally frustoconical shape including a short arc 130 and a long arc 132. Additionally, as the gases are expressed from the cavity 18, the stabilizing geometry 118 will undergo tension forces 134. Due to the shape of the stabilizing geometry 118, the tension forces 134, upon evacuation of the cavity 18, will press against the deflection control features 28. These tension forces 134 will tend to flatten the stabilizing geometry 118. In turn, the overall inward compressive force includes a biasing force 136 that may act upon the short and long arcs 130, 132. The biasing force 136 may act upon an inner portion 138 of the short arc 130 and an outer portion 140 of the long arc 132. Generally, the central flattening portion 22 includes a high portion 142 and a low portion 144, where the high portion 142 undergoes a stronger tension force 134 than does the low portion 144. Moreover, where a single stabilizing geometry 118 is used, the short arc 130 may be generally located on the high portion 142 of the central flattening portion 22, and the long arc 132 may be generally located on the low portion 144 of the central flattening portion 22.

Figure 13:
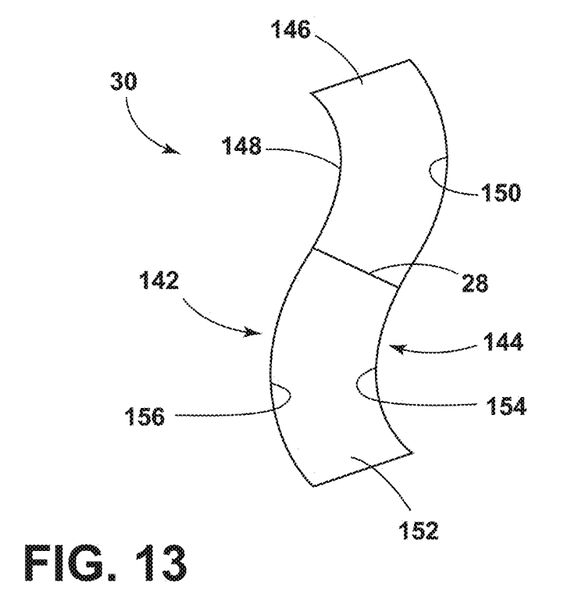
FIG. 13 is a schematic view of two stabilizing geometries in the rest state of the present disclosure.

It is generally contemplated that when there are multiple stabilizing geometries 118, the long arc 132 may alternatively be located at the high portion 142 and the short arc 130 may be located at the low portion 144 of the central flattening portion 22. For example, as shown in FIG. 13, a first stabilizing geometry 146, including a first short arc 148 and a first long arc 150, is adjacent a second stabilizing geometry 152, including a second short arc 154 and a second long arc 156. Accordingly, as illustrated, the first short arc 148 is adjacent the second long arc 156 on the high portion 142 of the central flattening portion 22, and the first long arc 150 is adjacent the second short arc 154 on the low portion 144 of the central flattening portion 22.

Figure 10:
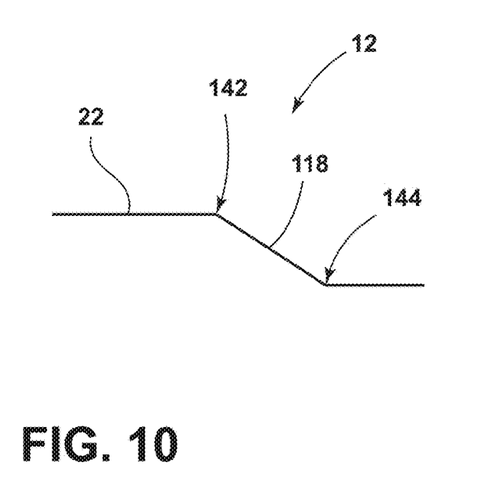
FIG. 10 is a schematic cross-sectional view of the stabilizing geometry of FIG. 9, taken along the line X-X, in the rest state of the present disclosure.
Figure 11:
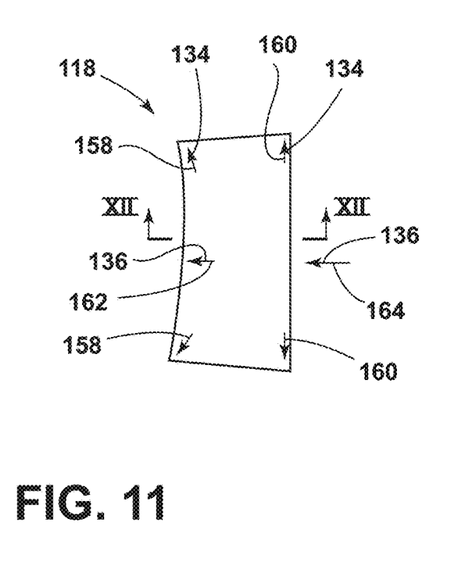
FIG. 11 is a schematic view of the stabilizing geometry in the expressed state of the present disclosure.
Figure 12:
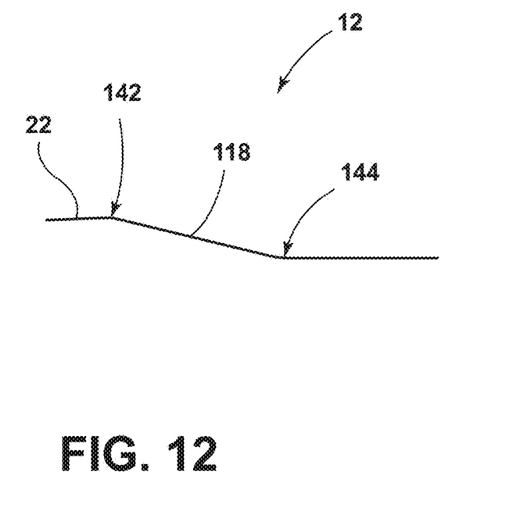
FIG. 12 is a schematic cross-sectional view of the stabilizing geometry of FIG. 11, taken along the line XII-XII, in the expressed state of the present disclosure.
Figure 14:
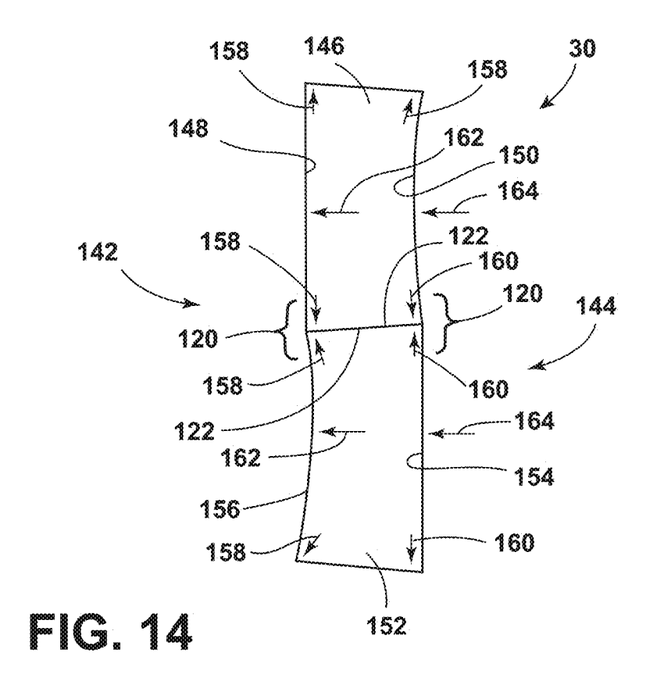
FIG. 14 is a schematic view of the two stabilizing geometries in the expressed state of the present disclosure.

As the insulating structure 12 transitions into the expressed state 100, the tension forces 134 push against the deflection control features 28 of the stabilizing geometry 118. The tension force 134 along the short arc 130 is a large tension force 158 whereas the tension force 134 along the long arc 132 is a small tension force 160. Thus, as illustrated in FIG. 14, the large tension force 158 of the first short arc 148 opposes the small tension force 160 of the second long arc 156 as the insulating structure 12 transitions from the rest state 26 to the expressed state 100 (FIG. 14). Further, as illustrated in FIGS. 10 and 12, the biasing forces 136 are stronger at the high portion 142 than at the low portion 144. The opposingly adjacent forces 120 meet at a compression area 122 that resists the downward deflection of the adjacent deflection control features 28.

In addition, the stabilizing geometries 118 use the opposingly adjacent forces 120 to prevent flattening of the central flattening portion 22 to a co-planar position with respect to the outer edges of the first and second panels 14, 16. By preventing the co-planar position, the central flattening portion 22 is prevented from collapsing inward, beyond the co-planar position. Also, in reference to a single stabilizing geometry 118, the short arc 130 may undergo a large biasing force 162, as the short arc 130 may be positioned relative the high portion 142 of the central flattening portion 22. In further reference to a single stabilizing geometry 118, the long arc 132 may correspondingly undergo a small biasing force 164, as the long arc 132 may be positioned relative the low portion 144 of the central flattening portion 22.

Figure 8:
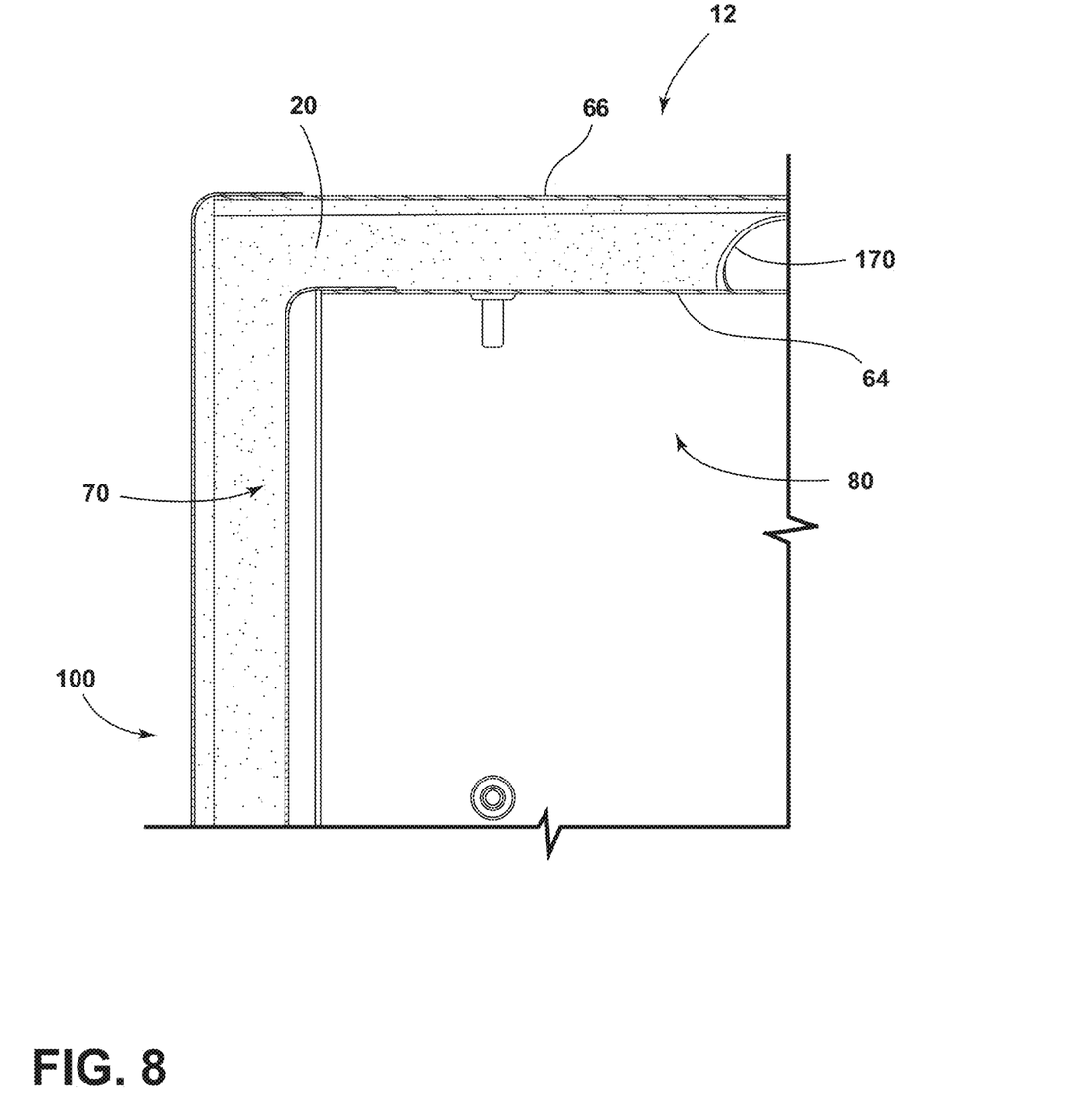
FIG. 8 is a cross-sectional view of the insulating structure of FIG. 7, in an expressed state of the present disclosure.
Figure 9:
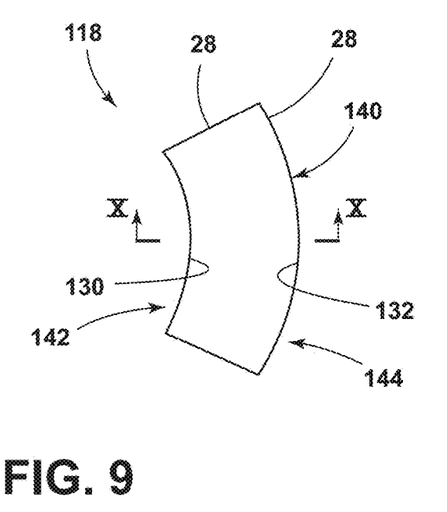
FIG. 9 is a schematic view of a stabilizing geometry in the rest state of the present disclosure.

Thus, each stabilizing geometry 118 may have a different shape to brace against the opposingly adjacent forces 120 of the neighboring stabilizing geometry 118 to define the compression arc that resists inward deflection. For example, the stabilizing geometries 118 may have a frustoconical shape, a rectangular shape, an arcuate trapezoidal shape, or other geometric shapes known in the art. The opposingly adjacent forces 120 may include either the large tension force 158, the small tension force 160, or both. These opposingly adjacent forces 120 of the stabilizing geometries 118 may substantially offset the biasing force 136 when the insulating structure 12 enters the expressed state 100 (FIG. 8). Further, the deflection control features 28 form an outline 166 of the stabilizing geometries 118 such that the stabilizing geometries 118 may be defined by the deflection control features 28. For example, the deflection control features 28 of the first stabilizing geometry 146 may also define the second stabilizing geometry 152. Said another way, the outline 166 defined by the deflection control features 28 of the first stabilizing geometry 146 may share a deflection control feature 28 of the second stabilizing geometry 152.

Referring again to FIGS. 2-4, evacuation ports 170 are depicted lateral the outer perimeter 112 of the central flattening portion 22. The evacuation ports 170 are used to express gases from the cavity 18 forming the at least partial vacuum 70. As such, the first and second panels 14, 16 are drawn together and decrease the size of the cavity 18, thus forming the insulating structure 12 in the expressed state 100. In part to accommodate the evacuation ports 170, the curved portions 114 of the central flattening portion 22 may have a substantially serpentine configuration. For example, multiple curved portions 114 may be in sequence where a first curved portion 172 has an inward curve 174 and a second curved portion 176 has an outward curve 178, relative the central flattening portion 22. The first and second curved portions 172, 176 may provide greater resistance to the vacuum bow than if the straight edge 116 continued along a body length 180 of the insulating structure 12.

Alternatively, the evacuation ports 170 may be positioned centrally or in a corner 182 of the first or second panels 14, 16. Additionally, the insulated structural cabinet 54 includes a recessed portion 184, as illustrated, below the evacuation ports 170 on at least one of the plurality of panels 62. The deflection control features 28 of the recessed portion 184 may include substantially linear stabilizing geometries 118. The recessed portion 184 may be configured to fit around the mechanical components of the appliance 10 such as, for example, motors and compressors.

Figure 5:
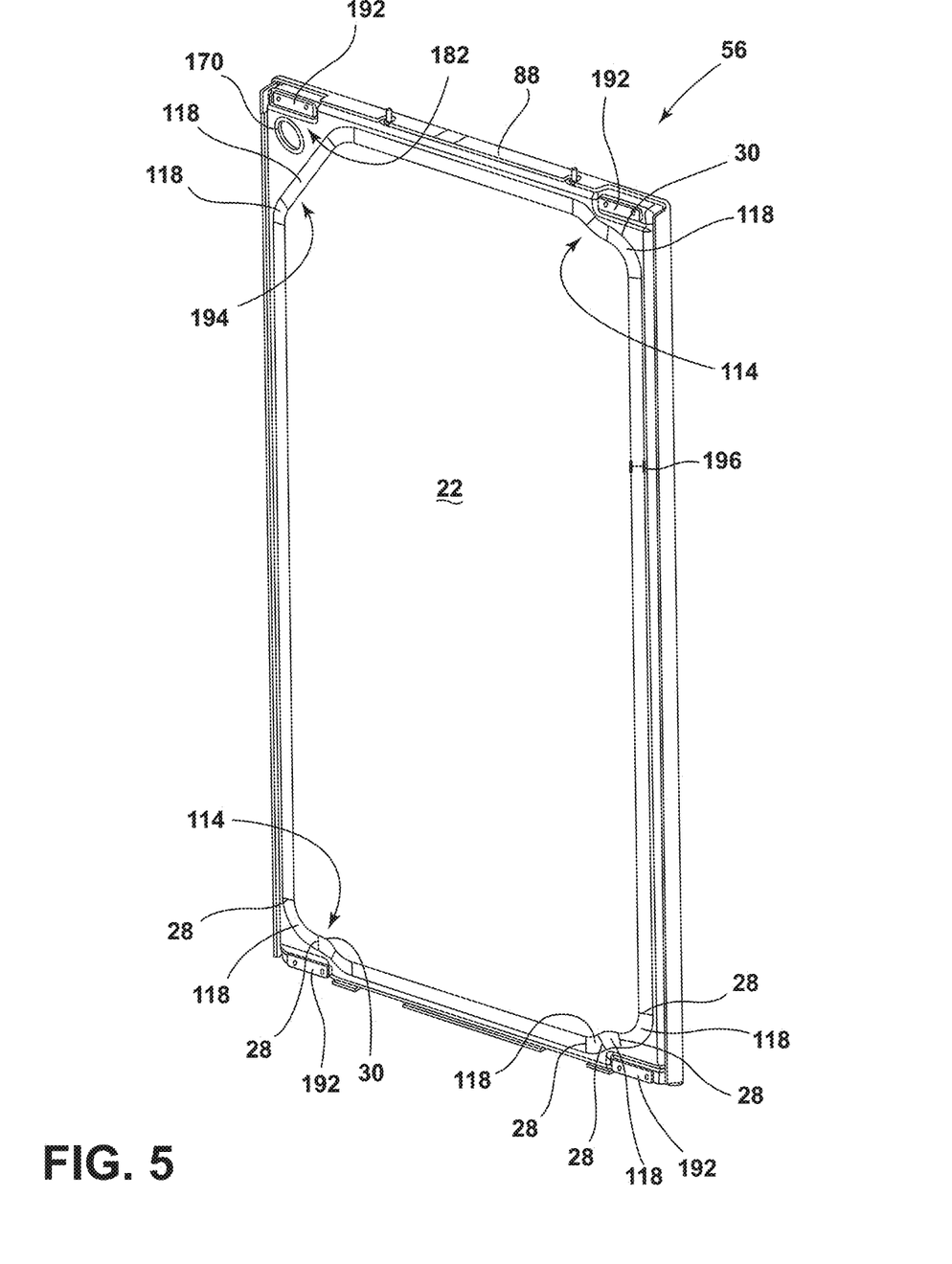
FIG. 5 is a top perspective view of an insulated panel of the present disclosure.
Figure 6:
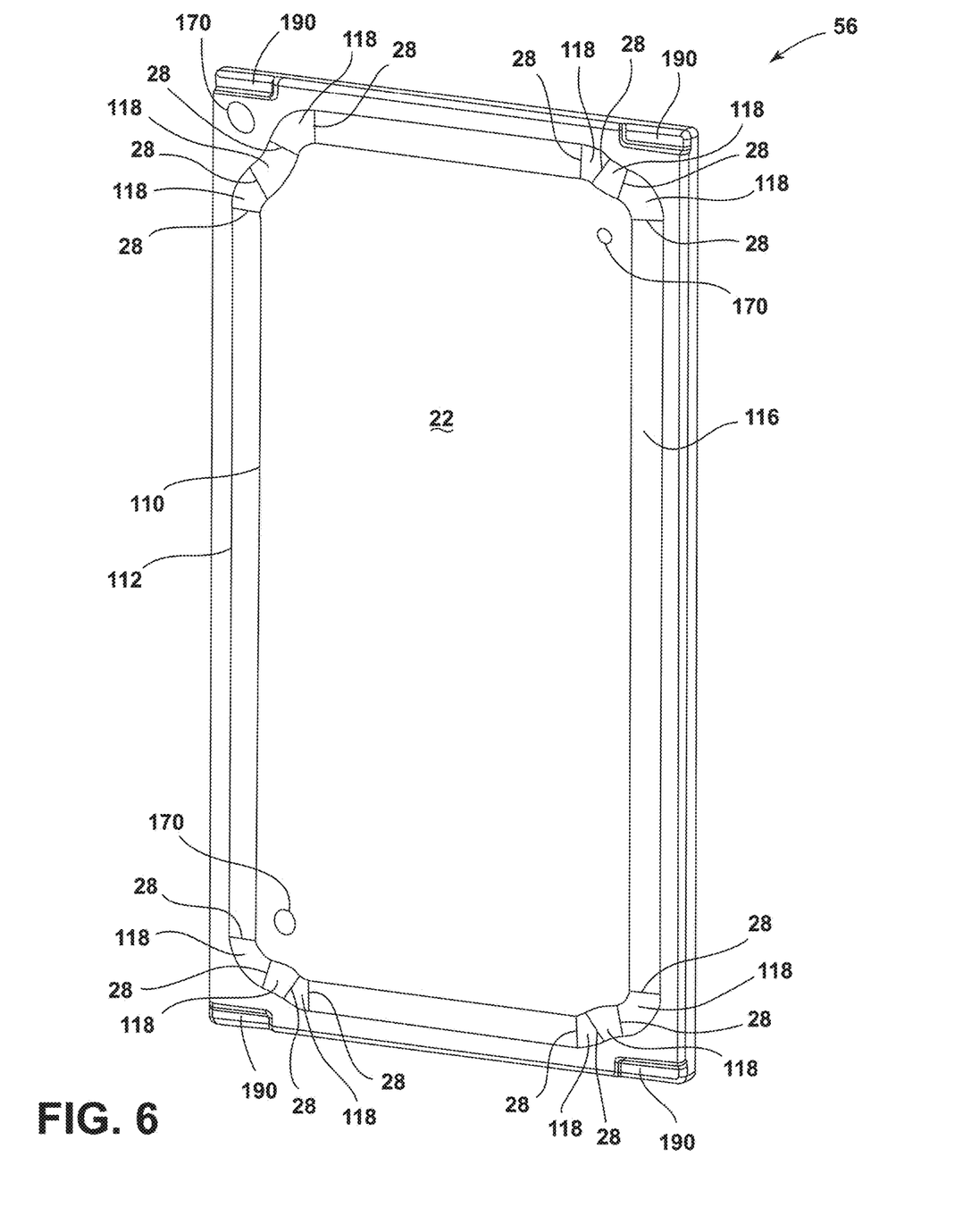
FIG. 6 is a top perspective view of the insulated panel of the present disclosure.
Figure 7:
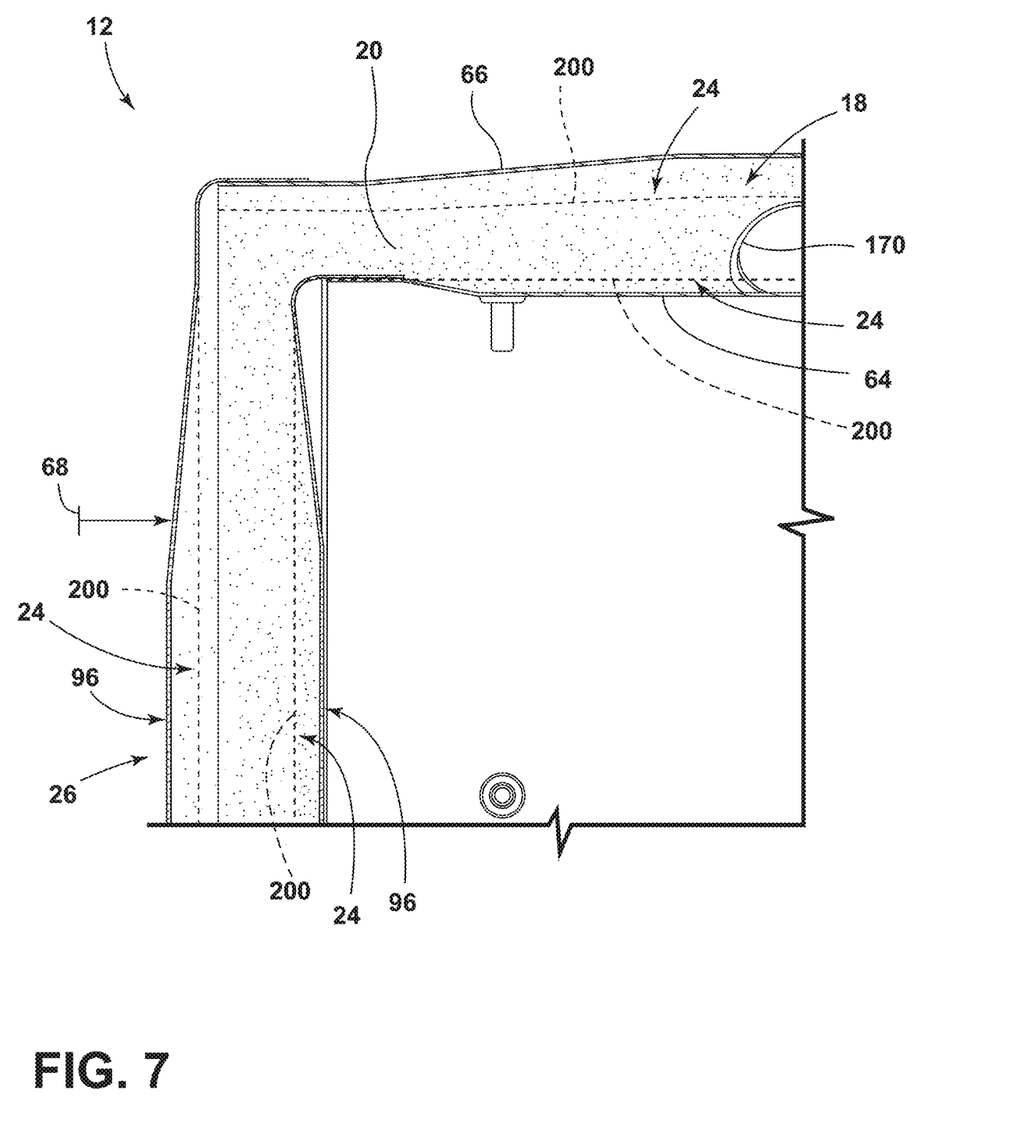
FIG. 7 is a cross-sectional view of the insulating structure of FIG. 3, taken along the line VII-VII, in a rest state of the present disclosure.

In further reference to FIGS. 5 and 6, the first and second panels 14, 16 of the insulating structure 12 are coupled to the trim breaker 88, which helps to define the cavity 18. Additionally, the first and second panels 14, 16 may include corner edges 190 configured to receive fasteners 192. These fasteners 192 typically connect the insulated panel 56 with the appliance 10. For example, the insulated panel 56 may be used in the door 50 of the appliance 10 and the fasteners 192 may provide the coupling means between the door 50 and the insulated panel 56. The insulated panel 56, as illustrated in FIG. 6, includes four curved portions 114. It is generally contemplated that the curved portions 114 have a substantially scallop-shape such that, by way of example and not limitation, three structural reinforcements 30, each with three different stabilizing geometries 118, may comprise the curved portions 114. Alternatively, as shown in FIG. 5, in order to accommodate the evacuation port 170, the insulated panel 56 may include three generally scallop-shaped curved portions 114 and one diagonal portion 194 having different stabilizing geometries 118. In one example, the inner and outer perimeters 110, 112 of the central flattening portion 22 may have a narrow width 196; however, it is also contemplated that the inner and outer perimeters 110, 112 may have a wide width 198.

Referring again to FIGS. 7 and 8, the insulating structure 12 is shown in the rest state 26 in FIG. 7 and in the expressed state 100 in FIG. 8. It is generally contemplated that the structural reinforcements 30 substantially maintain the structural integrity of the insulating structure 12 such that the central flattening portion 22 deflects in a controlled manner. For example, the dashed line illustrated in FIG. 7 indicates a desired deflection 200 of the central flattening portion 22 such that the insulating structure 12 meets a desired flatness of approximately one millimeter of height away from co-planar. Although the cavity 18 is filled with the insulation material 20, it is the structural reinforcements 30, the stabilizing geometries 118, and the deflection control features 28 of the curved portions 114 that ultimately allow the central flattening portion 22 to resist the vacuum bow.

By way of example, and not limitation, the curved portions 114 also help control vacuum bow within approximately two millimeters of deflection. Additionally, the insulating structure 12 may then be evacuated in a controlled and uniform manner such that the central flattening portions 22 of the first and second panels 14, 16 typically deflect in unison. This may be accomplished by including the varying stabilizing geometries 118. The shape of the stabilizing geometries 118 may allow for the controlled vacuum bow, as discussed in more detail above. For example, when expressing gases from the cavity 18, the central flattening portion 22 is typically drawn inward toward the cavity 18, resulting in vacuum bow. When this occurs, the biasing forces 136 of each of the opposingly adjacent stabilizing geometries 118 oppose the inward compressive force 68 from the central flattening portion 22. For example, the deflection control features 28 of the stabilizing geometries 118 may disperse the biasing forces 136 and, as a result, the stabilizing geometries 118 compress in a controlled manner.

Referring now to FIGS. 1-15, having described various aspects of the insulating structure 12, a method 300 is disclosed for forming a structural cabinet 54 for an appliance 10. According to the method 300, central flattening portions 22 of a first panel 14 and a second panel 16 are formed (step 302). A plurality of structural reinforcements 30 are disposed proximate curved portions 114 of the central flattening portions 22 of the first and second panels 14, 16 (step 304). The plurality of structural reinforcements 30 may also be defined by the curved portions 114. According to the method 300, the first and second panels 14, 16 are coupled to partially define a cavity 18 therebetween (step 306). The cavity 18 may further be defined by a trim breaker 88 coupled to the first and second panels 14, 16. An insulation material 20 is then disposed within the cavity 18 such that the insulation material 20 fills the cavity 18 space (step 308).

Figure 15:
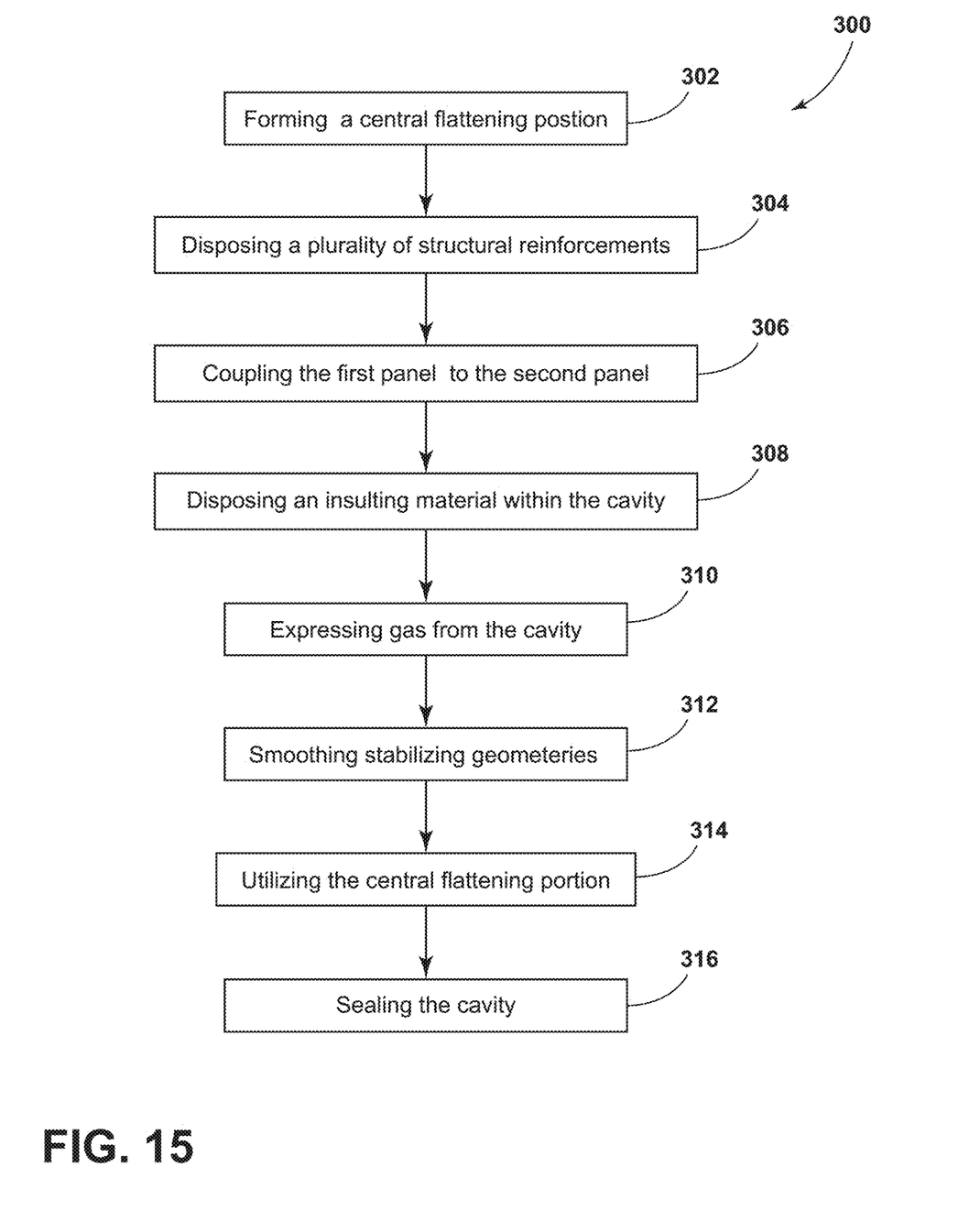
FIG. 15 is a flow diagram of a method of forming a structural cabinet for an appliance of the present disclosure.

Gas is then expressed from the cavity 18 to define an at least partial vacuum 70 within the cavity 18 (step 310). Accordingly, stabilizing geometries 118 of the structural reinforcements 30 are partially smooth such that the stabilizing geometries 118 are less perceptible (step 312). The central flattening portion 22 along with the plurality of structural reinforcements 30 are then used to deflect vacuum bow (step 314). The first and second panels 14, 16 are then positioned to oppose an inward compressive force 68 such that the central flattening portions 22 of the first and second panels 14, 16 compress to maintain a substantially consistent distance between the first panel 14 and the second panel 16 when the cavity 18 is sealed (step 316).

According to the various examples, the insulating structure 12 can be used in various appliances 10 that can include, but are not limited to, refrigerators, freezers, coolers, ovens, dishwashers, laundry appliances, water heaters, and other similar appliances and fixtures within household and commercial settings. Additionally, the insulation materials 32 can be a free-flowing material that can be poured, blown, compacted or otherwise disposed within the cavity 18. This free-flowing material can be in the form of various silica-based materials, such as fumed silica, precipitated silica, nano-sized and/or micro-sided aerogel powder, rice husk ash powder, perlite, glass spheres, hollow glass spheres, cenospheres, diatomaceous earth, combinations thereof, and other similar insulating particulate material.

According to another aspect of the present disclosure, an insulating structure for an appliance includes a first panel, a second panel coupled to the first panel, wherein the first and second panels define a cavity, an insulation material disposed within the cavity, at least one central flattening portion of the first and second panels, the at least one central flattening portion defining an enlarged area of the cavity in a rest state and having deflection control features, and structural reinforcements defined by deflection control features of the at least one central flattening portion.

According to another aspect of the present disclosure, the at least one central flattening portion includes a first central flattening portion on the first panel and a second central flattening portion of the second panel.

According to still another aspect of the present disclosure, the structural reinforcements include stabilizing geometries.

According to another aspect of the present disclosure, the at least one central flattening portion includes a plurality of scallop-shaped portions.

According to yet another aspect of the present disclosure, the structural reinforcements are generally scallop-shaped.

According to another aspect of the present disclosure, the structural reinforcements are configured to stabilize the at least one central flattening portion in an expressed state.

According to another aspect of the present disclosure, the at least one central flattening portion is approximately 1 millimeter offset from a remainder of the first and second panels in an expressed state.

According to still another aspect of the present disclosure, the coupled first and second panels define a structural member.

According to another aspect of the present disclosure, an appliance includes an at least one first panel, an at least one second panel, wherein the at least one first and second panels are coupled to define a structural member, a cavity defined between the at least one first and second panels, and further wherein an at least partial vacuum is defined within the cavity, insulation materials disposed between the at least one first and second panels, a central flattening portion of each of the at least one first and second panels, and structural reinforcements proximate the central flattening portion.

According to another aspect of the present disclosure, multiple first panels are coupled to multiple second panels to further define a structural cabinet.

According to yet another aspect of the present disclosure, the central flattening portion further includes curved portions, wherein the curved portions are generally scallop-shaped.

According to another aspect of the present disclosure, the scallop-shaped curved portions are configured to absorb an inward compressive force generated by the partial vacuum.

According to another aspect of the present disclosure, the structural reinforcements further include stabilizing geometries, wherein the stabilizing geometries are configured to resist deflection to a co-planar state.

According to still another aspect of the present disclosure, the stabilizing geometries are substantially imperceptible upon expressing gas from the cavity.

According to another aspect of the present disclosure, the central flattening portion of the at least one first panel and the central flattening portion of the at least one second panel are configured to compress such that the central flattening portions are flush with the at least one first and the at least one second panels, respectively.

According to another aspect of the present disclosure, the structural reinforcements are substantially imperceptible upon expressing gas from the cavity.

According to yet another aspect of the present disclosure, the central flattening portion of each of the at least one first panel and the at least one second panel is a scallop-shape.

According to another aspect of the present disclosure, the at least one first panel and the at least one second panel further include corner edges, and fastener portions proximate the corner edges.

According to another aspect of the present disclosure, a method of forming a structural cabinet for an appliance including the steps of forming a central flattening portion of each of a first panel and a second panel, disposing a plurality of structural reinforcements proximate curved portions of the central flattening portions of the first and second panels, coupling the first panel to the second panel to define a cavity therebetween, disposing an insulation material within the cavity, the insulation material filling the cavity, expressing gas from the cavity to define an at least partial vacuum within the cavity, utilizing the central flattening portions and the plurality of structural reinforcements to deflect vacuum bow, and sealing the cavity, wherein the first and second panels are positioned to oppose an inward compressive force such that the central flattening portions of the first and second panels compress to maintain a consistent distance between the first panel and the second panel.

According to still another aspect of the present disclosure, the step of expressing gas from the cavity further includes the step of smoothing stabilizing geometries of the plurality of structural reinforcements such that the stabilizing geometries are substantially imperceptible.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance comprising:
    an at least one first panel;
        an at least one second panel, wherein the at least one first and second panels are coupled to define a structural member;
        a cavity defined between the at least one first and second panels, and further wherein an at least partial vacuum is defined within the cavity, wherein the at least partial vacuum generates an inward compressive force that is exerted on the at least one first and second panels toward the cavity;
        insulation materials disposed between the at least one first and second panels;
        a central flattening portion of each of the at least one first and second panels, the central flattening portion including a high portion and a low portion, wherein the inward compressive force of the at least partial vacuum biases and deflects the high portion toward a co-planar position with respect to the low portion; and
    structural reinforcements defined by the central flattening portion of the at least one first and second panels and extending between the high portion and the low portion, the inward compressive force of the at least partial vacuum deflecting the structural reinforcements and the central flattening portion toward the co-planar position, the structural reinforcements being scallop-shaped curved portions that are configured to prevent deflection of the central flattening portion beyond the co-planar position of the high and low portions, wherein:
    the deflection of the scallop-shaped curved portions are configured to absorb the inward compressive force generated by the at least partial vacuum to prevent the deflection of the central flattening portion beyond the co-planar position;
    the structural reinforcements further comprising stabilizing geometries that are configured to resist the inward compressive force and resist deflection of the central flattening portion beyond the co-planar position; and
    upon expression of gas from the cavity, the central flattening portion of the at least one first panel and the central flattening portion of the at least one second panel are configured to deflect under the inward compressive force such that the central flattening portions are flush with the at least one first and the at least one second panels, respectively.

2. The appliance of claim 1, wherein multiple first panels are coupled to multiple second panels to further define a structural cabinet.

3. The appliance of claim 1, wherein the at least one first panel and the at least one second panel further comprise:
    corner edges; and
    fastener portions proximate the corner edges.

4. The appliance of claim 1, wherein the at least one first panel and the at least one second panel are coupled together to define an insulated structural panel.

5. The appliance of claim 1, wherein the at least one first panel is a metallic panel.

6. The appliance of claim 1, wherein the at least one second panel is a metallic panel.

7. The appliance of claim 1, wherein the insulation materials include at least one of a silica-based material, rice husk ash powder, perlite, glass spheres, hollow glass spheres, cenospheres, and diatomaceous earth.

* * * * *